(12) United States Patent
Lee

(10) Patent No.: US 10,168,020 B2
(45) Date of Patent: Jan. 1, 2019

(54) COMPLEX LIGHTING FOR VEHICLE

(71) Applicant: LG INNOTEK CO., LTD., Seoul (KR)

(72) Inventor: Jung Ho Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 123 days.

(21) Appl. No.: 15/114,959

(22) PCT Filed: Jan. 27, 2015

(86) PCT No.: PCT/KR2015/000859
§ 371 (c)(1),
(2) Date: Jul. 28, 2016

(87) PCT Pub. No.: WO2015/115777
PCT Pub. Date: Aug. 6, 2015

(65) Prior Publication Data
US 2016/0341396 A1 Nov. 24, 2016

(30) Foreign Application Priority Data

Jan. 29, 2014 (KR) .................... 10-2014-0011126

(51) Int. Cl.
F21V 7/00 (2006.01)
F21V 7/09 (2006.01)
(Continued)

(52) U.S. Cl.
CPC ............ *F21V 7/0025* (2013.01); *F21S 41/24* (2018.01); *F21S 41/36* (2018.01); *F21S 43/14* (2018.01);
(Continued)

(58) Field of Classification Search
CPC ........ F21V 7/0025; F21V 7/09; F21V 23/005; F21S 48/1382; F21S 48/215;
(Continued)

(56) References Cited

U.S. PATENT DOCUMENTS 9,746,603 B2 * 8/2017 Lee .................... G02B 6/0096
2007/0076421 A1   4/2007 Kogo et al.
(Continued)

FOREIGN PATENT DOCUMENTS

JP   2007-103210   4/2007
JP      3156238   12/2009
(Continued)

OTHER PUBLICATIONS

International Search Report and Written Opinion dated Jun. 1, 2015 issued in Application No. PCT/KR2015/000859 (with English Translation).
(Continued)

*Primary Examiner* — Suezu Ellis
(74) *Attorney, Agent, or Firm* — KED & Associates, LLP

(57) ABSTRACT

An embodiment may include a complex lighting for a vehicle. The complex lighting may include a first lighting unit configured to include a first light source module, and a first reflection module having an inlet portion of an incidence light of the first light source module, a light transfer path through which the incidence light transfers and an outlet portion of the incidence light. The complex lighting may also include a second lighting unit configured to be disposed adjacently to the first lighting unit, and to receive the light of the outlet portion of the first lighting unit and then control the amount of light emission. A bottom inside of the first reflection module may include a curvature area.

18 Claims, 4 Drawing Sheets

(51) Int. Cl.

| | |
|---|---|
| *F21S 43/236* | (2018.01) |
| *F21S 41/24* | (2018.01) |
| *F21S 41/36* | (2018.01) |
| *G02B 6/00* | (2006.01) |
| *F21V 8/00* | (2006.01) |
| *F21V 23/00* | (2015.01) |
| *F21S 43/19* | (2018.01) |
| *F21S 43/14* | (2018.01) |
| *F21S 43/31* | (2018.01) |
| *F21S 43/33* | (2018.01) |
| *F21Y 115/10* | (2016.01) |

(52) U.S. Cl.
CPC ............. *F21S 43/19* (2018.01); *F21S 43/236* (2018.01); *F21S 43/31* (2018.01); *F21S 43/33* (2018.01); *F21V 7/09* (2013.01); *F21V 23/005* (2013.01); *G02B 6/0055* (2013.01); *F21Y 2115/10* (2016.08)

(58) Field of Classification Search
CPC .. F21S 48/234; F21S 48/1159; F21S 48/1388; F21S 48/238; F21S 48/328; F21S 43/14; F21S 43/145; F21S 43/235; F21S 43/236; F21S 43/247; F21S 43/249; F21S 41/24; F21S 41/32; F21S 41/322; F21S 41/33–41/338; F21S 41/36; F21Y 2115/10; G02B 6/0035; G02B 6/0036; G02B 6/0043; G02B 6/0053; G02B 6/0055; G02B 6/0061; G02B 6/0068; G02B 6/007; G02B 6/0073; G02B 6/0096
See application file for complete search history.

(56) References Cited

U.S. PATENT DOCUMENTS

| | | | |
|---|---|---|---|
| 2013/0044503 A1* | 2/2013 | Mihara | ............... F21S 48/1241 362/511 |
| 2015/0362659 A1* | 12/2015 | Nishihata | ............. G02B 6/0038 362/511 |
| 2017/0002992 A1* | 1/2017 | Lee | ........................ F21S 48/215 |

FOREIGN PATENT DOCUMENTS

| | | |
|---|---|---|
| JP | 2010-003567 | 1/2010 |
| JP | 2012-038424 | 2/2012 |
| WO | WO 2009/110477 | 9/2009 |

OTHER PUBLICATIONS

Korean Office Action dated Jan. 29, 2016 issued in Application No. 10-2014-0011126.

* cited by examiner

US 10,168,020 B2

COMPLEX LIGHTING FOR VEHICLE

CROSS-REFERENCE TO RELATED PATENT APPLICATIONS

This application is a U.S. National Stage Application under 35 U.S.C. § 371 of PCT Application No. PCT/KR2015/000859, filed Jan. 27, 2015, which claims priority to Korean Patent Application No. 10-2014-0011126, filed Jan. 29, 2014, whose entire disclosures are hereby incorporated by reference.

TECHNICAL FIELD

Embodiments relate to a lighting unit which implements a high optical efficiency using a small amount of light source while having a free curvature with no restriction on the shape of installation places.

BACKGROUND ART

A lighting unit utilizing a variety of light sources used in an electronic apparatus has been implemented in such a way to increase an optical efficiency by using a light source appropriate for the characteristics of each electronic apparatus.

Recently, the lighting unit for use in such an electronic apparatus may apply to various fields such as a backlight unit used in a flat panel display, an indoor light used in an indoor environment, a headlight, a fog light, a back-up lamp, a side light, a license plate light, a taillight, a stop lamp, a turn signal lamp, and a hazard flasher lamp mounted on outside of a vehicle, or an interior light for a vehicle.

However, most of these lights generally employ an approaching method in an aspect of brightness of a surface light source by applying a member such as a light guide plate used to transfer light efficiently.

In case of a vehicle lighting, especially, the recent trend is developing to make a light source an LED used to implement a high optical efficiency. In case that a vehicle lighting uses a surface light source, an LED package is increasingly used as a light source. However, when the LED package is used as a light source, it is inevitable that a large amount of light is needed or the number of optical elements forming a light emitting surface for a surface emitting is increased. Also, when a number of LED packages is applied, there are many problems such as high cost, radiation, and circuit configuration in a curved portion or a narrow space of a vehicle, so that there exists a fatal shortcoming that leads to a high cost and a low efficiency. Also, in case of a taillight of a vehicle or a light emitting place whose surface has a curvature, it is difficult to embody a uniform luminous intensity on the entire light emitting surface so that a dark portion occurs at the front and rear of the curvature portion. Additional optical elements employed to prevent the dark portion inevitably lead to an increased cost.

INVENTION

Technical Problem

Embodiments of the present invention provide a complex lighting for a vehicle, capable of introducing light into a partial area, in which a dark portion occurs, in the case of a lighting device having a light emission surface curved or bent, thereby improving the optical efficiency, and at the same time, implementing a surface lighting having no light guide plate using a reflection module including a curvature reflection portion, thereby embodying a high optical efficiency with a small optical device.

Technical Solution

In accordance with an embodiment of the present invention, there is provided a complex lighting for a vehicle, comprising a first lighting unit configured to include a first light source module, and a first reflection module having an inlet portion of an incidence light of the first light source module, a light transfer path through which the incidence light transfers and an outlet portion of the incidence light; and a second lighting unit configured to be disposed adjacently to the first lighting unit, and to receive the light of the outlet portion of the first lighting unit and then control the amount of light emission, wherein a bottom inside the first reflection module includes a curvature area.

Advantageous Effects

According to an embodiment of the present invention, there is provided a vehicle lamp, capable of introducing light into a partial area, in which a dark portion occurs, in the case of a lighting device having a light emission surface curved or bent, thereby improving the optical efficiency.

Further, according to an embodiment of the present invention, there is an effect that a surface lighting is embodied in a configuration having no light guide plate using a reflection module including a curvature reflection portion for a vehicle, thereby embodying a high optical efficiency with a small optical device.

Further, there is an effect that an optical source module mounted on an outer place of a variety of vehicles may be mounted a narrow space in a form having a variety of curves, capable of being mounted in a narrow area compared with a high optical efficiency and improving a design freedom.

BEST MODE

Figure 1:
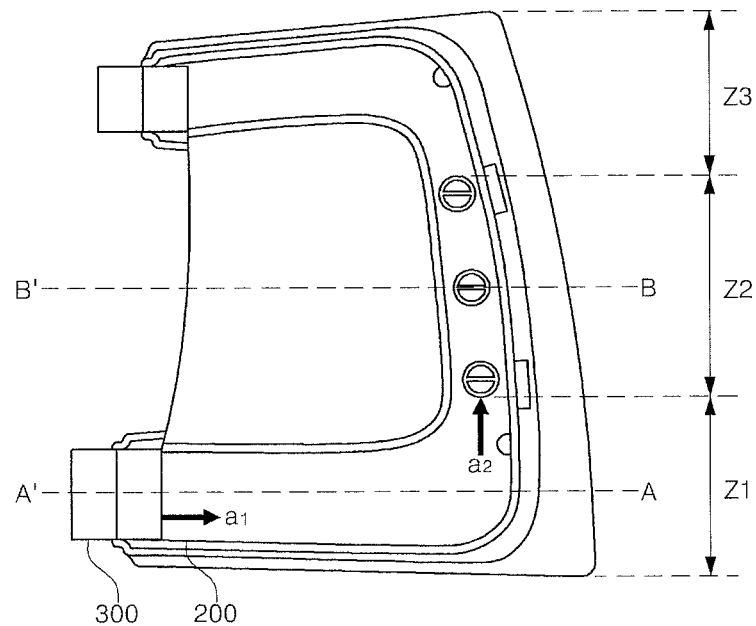
FIG. 1 is a perspective view of a complex lighting for a vehicle according to an embodiment of the present invention.

Hereinafter, a configuration and an operation of the present invention will be described in detail with reference to the accompanying drawings. When describing them with reference to the accompanying drawings, the same reference numerals are used to indicate the same components regardless of drawing symbols throughout the specification, and their duplicated description will be omitted. While the terms such as "first" and "second" may be used to describe a variety of constitutional elements, the constitutional elements should not be restricted to the terms. The terms are used only for the purpose of separating one constitutional element from another one.

Figure 2:
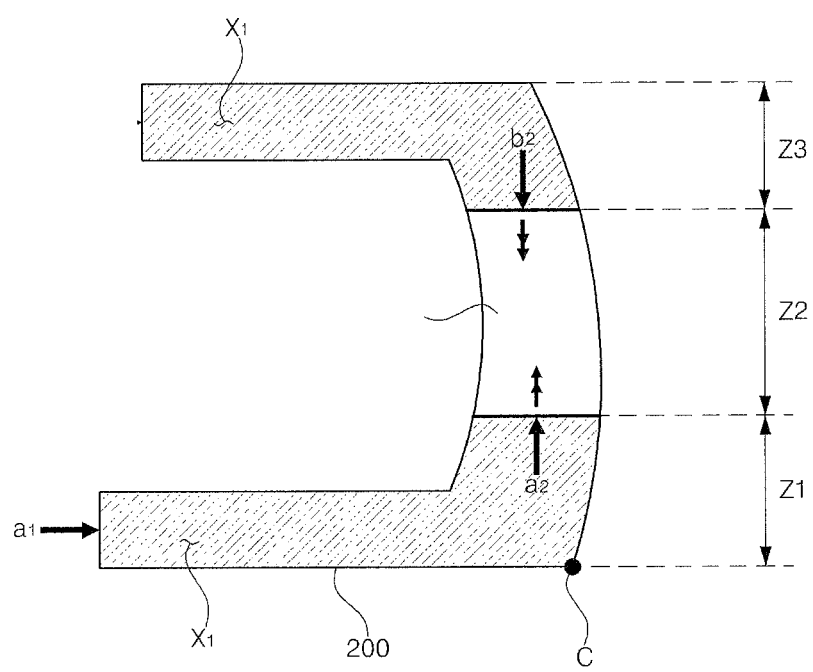
FIG. 2 is a conceptual plan view that schematically illustrates a complex lighting for a vehicle in FIG. 1.

FIG. 1 is a perspective view of a complex lighting for a vehicle according to an embodiment of the present invention, and FIG. 2 is a conceptual plan view that schematically illustrates a complex lighting for a vehicle in FIG. 1.

Referring to FIGS. 1 and 2, a complex lighting for a vehicle according to an embodiment of the present invention is configured to include a first lighting unit Z1 configured to include a first reflection module having an inlet portion of an incidence light of a first light source module, a light transfer path through which the incidence light transfers and an outlet portion, and a second lighting unit Z2 configured to receive the light of the outlet portion of the first lighting unit and then control the amount of light emission. That is, the light irradiated through the inside of the first lighting unit is upwardly emitted toward a light emission surface to realize a surface light emitting, some light is transferred to a bent dark portion to realize an indirect light emitting so that a uniformity is obtained in a vehicle lighting having many curvature structures, and the number of optical elements is reduced. Therefore, it may be possible to realize a simplified structure and a reduced cost.

Specifically, the complex lighting for a vehicle according to an embodiment of the present invention may be configured to include a first lighting unit Z1 that directly induces and emits an incident light irradiated from a light source module as an emission light, and a second lighting unit Z2 that performs an indirect emission through a discharging light introduced from the first lighting unit Z1, as illustrated in FIG. 1. Of course, it may be possible to embody a configuration Z3 in which the first lighting unit introducing light into the second lighting unit Z2 is added as a pair, depending on a using form, as illustrated in FIG. 1.

FIG. 2 is a conceptual plan view that schematically illustrates an upper plane of FIG. 1, which conceptually illustrates a plan view of a reflection module 200 (referring to FIGS. 3 and 4) forming a light transfer path through which light transfers. The light irradiated from the light source module disposed on an external end of the first lighting unit Z1 is incident into an inlet portion a1 of the reflection module 200. The incident light is reflected on a reflection layer inside the reflection module to move along a light transfer path x1 that is configured of a space formed of the reflection module. And, the light is upwardly emitted to realize a surface emission. Also, a portion of the light proceeds toward the outlet portion a2 to enter the inside x2 of the second lighting module Z2, and the amount of light of the second lighting module may be controlled using the above procedure. In this case, the reflection module according to an embodiment of the present invention may be configured to include at least one bent portion C as illustrated in FIG. 2. In this case, while light control and light transfer may be efficient in the light irradiation direction, it may be difficult to transfer light from a bent portion to the outlet portion, whereby a dark portion occurs. Here, the light inlet portion a1 may have a local area that hinders an entire uniformity of a surface emission due to a high intensity of light and a local dark portion that occurs in a near area of the light source depending on its incident angle.

In order to solve such a problem, the reflection module 200 of the first lighting unit Z1 according to an embodiment of the present invention forms a curvature area on the bottom of the reflection module which forms a light transfer path, and realizes a reflection layer in a portion of the curvature area, thereby enhancing a reflection efficiency and a transfer efficiency of light.

The above will be described in detail with reference to FIGS. 3 and 4.

Figure 3:
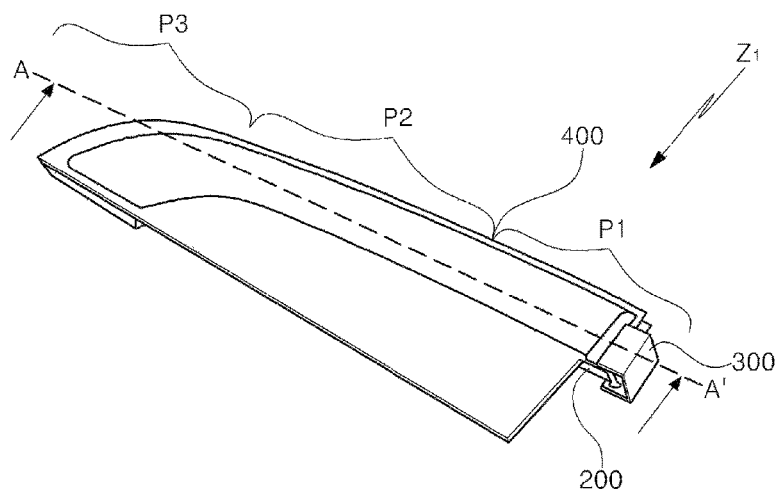
FIG. 3 is an essential perspective view illustrating a configuration of a first lighting unit (Z1) in FIG. 1.
Figure 4:
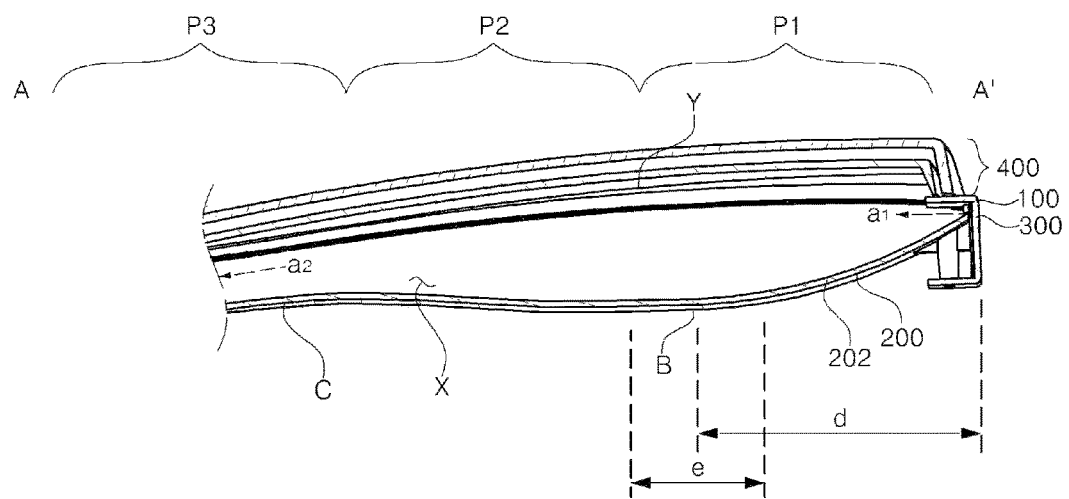
FIG. 4 is a sectional view taken along A-A' line in FIG. 3.

FIG. 3 is an essential perspective view illustrating a configuration of a first lighting unit (Z1) in FIG. 1, and FIG. 4 is a sectional view taken along A-A' line in FIG. 3.

As illustrated in FIGS. 3 and 4, the first lighting unit Z1 is configured to include a reflection module 200 that forms a space therein to form a light transfer path, and a light source module 100 that emits light toward the space of the reflection module. Especially, in case of the reflection module 200, it may be embodied to include a curvature area where the lower surface portion of the bottom surface includes at least one inflection point.

That is, the reflection module 200 according to an embodiment of the present invention enables the light emitted from the light source module 100 mounted in an edge portion which is an end of the reflection module 200 illustrated in FIG. 4 to be transferred to an opposite end along a light transfer path that realizes a space inside the reflection module 200 formed without a light guide plate so that the light is uniformly emitted upward. As described above, there are many bent structures in the surface emission area. In this case, as illustrated in FIG. 3, while the intensity of light is high in the P1 area near the light source module, a light loss or transfer is not implemented in the bent P3 area, so that a dark portion may be occurred. Also, even in the P1 area, a local dark portion may occur near the P1 area along the light emission direction of the light element. An embodiment of the present invention includes the reflection module 200 having a curved bottom as illustrated in FIG. 3 in order to solve such a problem.

The light source module 100 performs a function to emit light into the inside of the reflection module 200. Of course, the inside of the reflection module 200 has an empty structure formed of an air layer, which may form a light transfer path X of an emitted light. That is, the light is transferred to an end of the reflection module through the inside of the reflection module without any separate light guide plate, and in this procedure a light emission surface Y may be formed in the upward direction, which may realize a uniform surface emission.

The light source module 100 may basically include a printed circuit board having optical elements mounted thereon. In this case, the printed circuit board means a board having a circuit pattern thereon, that is, a PCB, which may include an opaque board, a transparent board and a flexible board. For example, it may be possible to obtain a solid bearing force using RF4 printed circuit board. On the other hand, it may be possible to dispose a bent surface more efficiently using a PET printed circuit board having a flexibility. According to an embodiment of the present invention, it may be possible to use a flexibility printed circuit board FPCB to obtain a predetermined flexibility. That is, according to an embodiment of the present invention, the printed circuit board may be any one of a metal core printed circuit board, FR-4 PCB and a general PCB, which is not limited thereto.

The light source configuring the light source module 100 is a portion in which at least one light source is arranged to emit light, which has a concept of including various light sources, a solid light emission element being applied as an example.

The embodiment of the present invention will be described by applying an LED as the optical element, for example. The LED may be embodied with a colored LED chip such as a red LED chip to generate a red light, a blue LED chip to generate a blue light, and a green LED chip to generate a green light, or an UV LED chip. Additionally, at least on LED chips may be mounted on the PCB, and the kind of the LED chip and the mounting number are not restricted. Also, a protection device to protect the light emitting device may be mounted (for example, a Zener diode).

In this case, the light source may be formed of a side view type light emitting diode. That is, a light emitting diode that emits light not directly upward but toward the side may be used as a light source of the present invention. This configuration may embody advantages to enhance a transfer ratio of the light emitted toward the reflection module 200 and to reduce a light loss.

Figure 5:
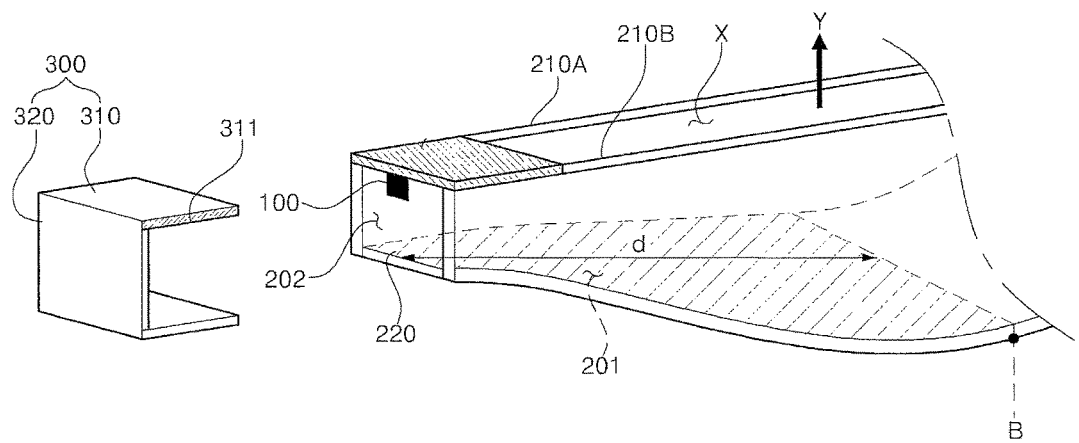
FIG. 5 shows an embodiment of a reflection module, in order to illustrate in more detail a reflection module described in FIG. 4.

FIG. 5 shows an embodiment of a reflection module, in order to illustrate in more detail a reflection module described in FIG. 4. Referring to FIGS. 4 and 5, the reflection module 200 is configured of a structure having a light transfer path X therein, its upper portion having a predetermined width and height and being opened, as illustrated in FIG. 5. An embodiment of such a light transfer path X may be a structure which includes a bottom 220 connected to a pair of first side portions 210A and 210B, the structure being a waterway having the light transfer path X therein. As described above, the light source module 100 emits light to the light transfer path X of the reflection module 200, and the emitted light collides with inner surfaces of the first side portions 210A and 210B and the bottom of the reflection module 200 and is reflected thereon to be transferred in the length direction of the reflection module. In this case, it is desirable that the light source module 100 is disposed in the second side portion which is an edge portion in the length direction of the reflection module.

Accordingly, the light source module 100 according to an embodiment of the present invention may be disposed in an outer end of the reflection module 200, and transfer and control the light by a reflection function of the reflection module transfer to embody a uniform light emission on the entire light emission surface. Accordingly, it is not needed to embody a number of LED packages that is disposed directly under the light emission surface Y in order to perform a surface emission on the entire area of the light emission surface Y and a separate light guide plate to transfer light is not needed. Therefore, there is an advantage that a uniform surface emission may be embodied with only a very small number of light sources.

To do this, the reflection module 200 may be formed of a material that has a reflection characteristic on its inner surface, or a structure in which the surface of a general synthetic or metallic material is coated with a reflection material.

Especially, in case of the reflection module 200 according to an embodiment of the present invention, it is desirable that a portion of the inner surfaces of the pair of the first side portions 210A and 210B connected to the bottom and the bottom 220 is formed to include a reflection layer having a reflection characteristic. Of course, it may also be possible to form the first side portions 210A and 210B and the bottom 220 with a material having a reflection characteristic without embodying a separate reflection layer, and the material having a reflection characteristic may be formed with a material including any one of Al, PC, PP, ABS and PBT.

The reflection layer may be embodied in a method where the inner surface of the reflection module 200 made of a synthetic resin material or a metallic material is deposited with Al or attached with an Al sheet, for example, and the same may also apply to the first reflection layer formed on the inner surface of the first side portions 210A and 210B, the second reflection layer 202 formed on a portion of the bottom 220 and the third reflection layer, and a second reflection layer and a third reflection layer to be described.

As embodiments of the first to third reflection layers, it is desirable to increase a reflection ratio using a resin material including a refection member or a structure having a surface coated with a reflection material, and the material may be a light reflection member, including a resin material, a metallic material and a non-metallic material, for example. In this case, the reflection member or reflection material may include at least one of Ag, Al, Pt, Cr, Ni, titanium oxide, silicon oxide, aluminum oxide, magnesium fluoride, tantalum oxide and zinc oxide.

The embodying material of the reflection layer is not limited to the above described material, and it may not be the sheet or film type but be a deposited film type or reflection pattern type. Also, the embodying material may be a synthetic resin which distributively contains a white pigment to realize a reflection characteristic of light and a characteristic to promote a light distribution. The white pigment may be titanium oxide, aluminum oxide, zinc oxide, lead carbonate, barium sulfate, calcium carbonate, etc., and the synthetic resin may be polyethylene terephthalate, polyethylene naphthalate, acrylic resin, polycarbonate, polystyrene, polyolefin, cellulose acetate, weatherproof vinyl chloride, etc. Also, it may be possible to embody a structure in which the reflection module has an increased reflection efficiency by patterning the inner surface of the reflection module using a reflection ink including any one of TiO2, CaCo3, BaSo4, Al2O3, Silicon and PS or patterning a reflection layer surface such as the above described sheet or coating using them.

Also, the reflection module 200 according to an embodiment of the present invention may be embodied to have a curvature structure in which the bottom 200 has at least one inflection point B, C.

In case of emitting the light of the light source module in FIGS. 4 and 5, while the amount of light that passes through the inlet portion a1 of the reflection module 200 to be transferred toward the center of the reflection module along the light transfer path is increased, there occurs a problem that a local dark portion is formed in a space between the first inflection point B and the light source module 100, whereby it becomes difficult to obtain the amount of reflection used to uniformly transfer light to the end of the reflection module 200. Accordingly, the curvature structure is formed on the bottom so that a reflection frequency of the light is increased to obtain an increased amount of light. To do this, a reflection layer (referred to as a second reflection layer 202, hereinafter) may be disposed on the surface of the bottom 220 between the first inflection point B and the light source module 100.

While the second reflection layer 202 may be formed on the entire inner surface of the bottom, the second reflection layer 202 may be formed within a distance to a second inflection point, where a first inflection point and the second inflection point are sequentially disposed from the first light source module in an embodiment of the present invention in order to realize a low coat and a high efficiency and a uniform optical characteristic. Especially, it is desirable that the second reflection layer 202 is formed up to a distance which is 0.9 to 1.1 times of a distance d to a first inflection point from the light source module 100, and the end of the second reflection layer 202 reaches a scope of a inflection point neighboring area e illustrated in FIG. 2. It is because the local dark area of the light source module 100 occurs most frequently in a distance scope which is 0.9~1.1 times of the distance d to the first inflection point, and an increase of an optical efficiency compared with its cost is not high in case of exceeding the scope.

The light transferred as described above is emitted to the light emission surface Y illustrated in FIG. 4 in a surface emission manner and a uniform light may be emitted in order to prevent a dark portion from occurring in the entire surface. Also, it may be possible that a portion of the transferred light is introduced into the inside of the second lighting unit through the outlet portion b2 to embody an indirect emission as described in FIG. 2.

Figure 6:
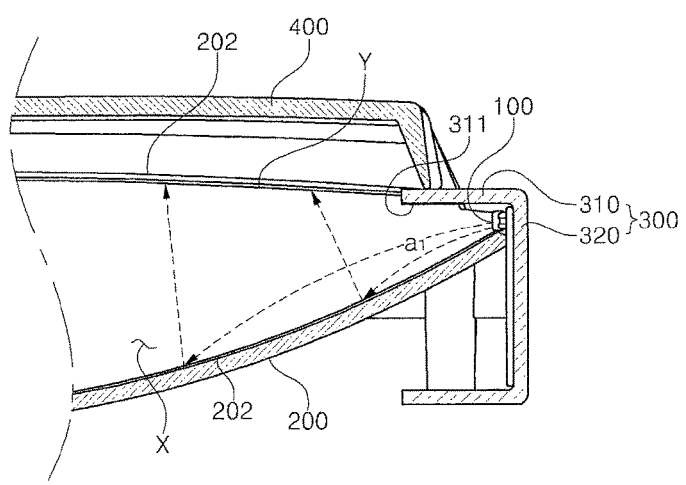
FIG. 6 is an essential sectional view describing a configuration and an operation of a second reflection module described in FIG. 5.

FIG. 6 is an essential sectional view describing a configuration and an operation of a second reflection module described in FIG. 5. Referring to FIGS. 5 and 6, as described above, the light source module 100 that emits light into the inside of the reflection module 200 according to an embodiment of the present invention is disposed in the end of the reflection module 200. In this case, the light emission of the light source module 100 proceeds to the inside of the reflection module 200 and a light emission width becomes very large immediately after the light emission, so that a high intensity light emits upward, thereby hindering a light uniformity and generating a light loss.

For this, in order to control the upward light emission and increase the amount of light proceeding to the inside of the reflection module 200, the embodiment of the present invention may further include a second reflection module 300 disposed upon the light source module. The second reflection module 300 may be any shape of form if it is formed to cover an upper surface of the light source module 100 so that the emitted light is reflected to proceed into the inside of the reflection module 200.

According to an embodiment, as illustrated in FIG. 5, the second reflection module 300 may include a reflection portion 310 that is disposed upon the light source module to reflect light into the inside of the reflection module 200, and a radiator 320 that extends from the reflection portion 310 to be disposed adjacently or closely to the rear surface of the light source module 100.

More preferably, it is desirable that the reflection portion 310 and the radiator 320 are embodied in a single body and formed with a same material, thereby increasing a radiation efficiency and at the same time performing a reflection function. In this case, the inner surface of the reflection portion 310 may further include a third reflection layer 311 in which a reflection material may be embodied in such a method as deposition, coating, etc. In this case, of course, as illustrated in FIG. 5, the reflection module 300 embodied with the reflection portion 310 and the radiator 320 in a single body performs a function to fixedly support the reflection module and the light source module entirely and stably as well as effects of an increased light reflection ratio and a radiation, thereby increasing a stability of equipment.

Additionally, a lighting unit according to an embodiment of the present invention may be configured to include an optical member 400 including a number of lens members or diffusion members upon the light emission surface Y in the structure illustrated in FIGS. 5 and 6.

Figure 7:
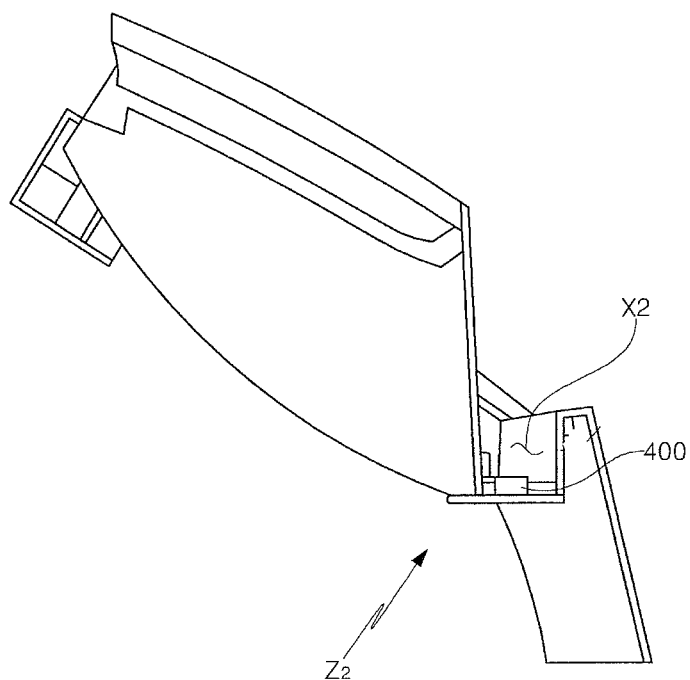
FIG. 7 is a sectional view taken along B-B' line in FIG. 1.
Figure 8:
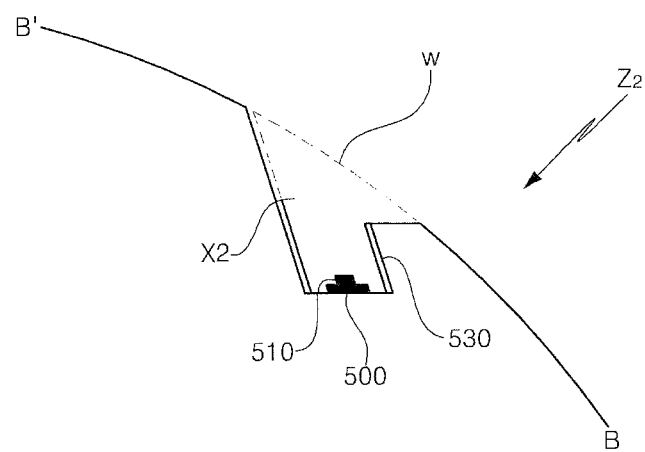
FIG. 8 is a conceptual view describing FIG. 7 in a conceptual structure.

FIG. 7 illustrates a structure of a second lighting unit Z2 to control the amount of light using the light introduced from the outlet portion a2 of the first lighting unit Z1 described in FIGS. 1 and 2, which shows a sectional view taken along B-B' line in FIG. 1, and FIG. 8 is a conceptual view describing FIG. 7 in a conceptual structure.

Referring to FIGS. 7 and 8, the second lighting unit Z2 includes a second space x2 forming a certain air layer to obtain light introduced through the outlet portion of the first lighting unit (Z1 in FIG. 1), and upwardly emits light toward the light emission surface W to solve a problem of a dark portion which occurs due to a difficulty of obtaining a sufficient amount of light caused by a bent structure and the like.

In this case, of course, a second light source module 500 that is packaged by mounting an optical element 510 such as an LED on a printed circuit board is disposed under the second space x2 of the second lighting unit Z2, thereby promoting a light efficiency. Even in such a case, since the obtainment of the amount of light is reinforced, it may be possible to embody a lighting with a structure having an optical device to the minimum so that costs may be highly reduced. Further, the inner surface of the space x2 of the second lighting unit Z2 may further include a reflection module 530 (referred to as "a third reflection module", hereinafter) including a reflection layer configured as the first lighting unit, so that an efficiency to extract the introduced light upward is enhanced and a light reflection ratio is increased even when the second light source module is added.

The above described complex lighting for a vehicle according to the present invention may apply to a taillight & a stop light and a turn signal. That is, it may apply to a variety of lighting needed lamp devices, for example, a lamp for a vehicle, a home lighting apparatus, and an industrial lighting apparatus. For instance, when applied to a lamp for a vehicle, it may include a head light, an interior lighting for a vehicle, a door scarf, and a rear light. In addition, the lighting apparatus of the present invention may also apply to a back light unit field applied in a liquid crystal device, and to all lighting related fields that were currently developed and commercialized or will be embodied according to a future technical development.

In the detailed description of the present invention as described above, detailed embodiments are described. However, various modifications will be made within the scope of the present invention. The technical idea of the present invention should not be restricted to the embodiments of the present invention described above, but be defined by appending claims and all equivalents to the claims.

REFERENCE NUMERALS

100: Light Source Module
200: Reflection Module
210A, 210B: First Side Portion
220: Bottom
230: Second Side Portion
300: Second Reflection Module
400: Optical Member
500: Second Light Source Module
Z1: First Lighting Unit
Z2: Second Lighting Unit

The invention claimed is:

1. A complex lighting for a vehicle, comprising:
  a first lighting unit configured to include a first light source module, and a first reflection module having an inlet portion of an incidence light of the first light source module, a light transfer path through which the incidence light transfers and an outlet portion of the incidence light; and
  a second lighting unit configured to be disposed adjacently to the first lighting unit, and to receive the light of the outlet portion of the first lighting unit and then control the amount of light emission, wherein a bottom inside of the first reflection module includes a curvature area, wherein the first lighting unit includes a space where an interior of a side portion extending from the bottom is embodied as a light transfer path, and wherein the side portion include a first side portion and a second side portion, wherein an inner surface of the first side portion extends from the bottom of the first reflection module and an inner surface of the second side portion extends from the bottom of the first reflection module.

2. The complex lighting for a vehicle of claim 1, further comprising a first reflection layer which is disposed on an internal surface of the side portion.

3. The complex lighting for a vehicle of claim 2, further comprising a second reflection layer which is disposed on a surface area of the bottom.

4. The complex lighting for a vehicle of claim 3, wherein the curvature area includes at least two inflection points.

5. The complex lighting for a vehicle of claim 4, wherein the second reflection layer is disposed within a distance to a second inflection point, where a first inflection point and the second inflection point are sequentially disposed from the first light source module.

6. The complex lighting for a vehicle of claim 4, wherein the second reflection layer including up to a distance which is 0.9 to 1.1 times of a distance d to a first inflection point from the first light source module.

7. The complex lighting for a vehicle of claim 4, further comprising a second reflection module that includes a reflection portion disposed on the first light source module.

8. The complex lighting for a vehicle of claim 7, wherein the reflection portion extends from the ends of the first and second side portions to cover a portion an upper surface of the first side portion.

9. The complex lighting for a vehicle of claim 7, wherein the second reflection module comprises a radiator that extends from an outer end of the reflection portion to be adjacent to the first light source module.

10. The complex lighting for a vehicle of claim 9, wherein the reflection portion and the radiator are integrated in a single body.

11. The complex lighting for a vehicle of claim 9, wherein an inner surface of the reflection portion comprises a third reflection layer.

12. The complex lighting for a vehicle of claim 4, further comprising an optical member in the direction of a light emission surface facing the bottom.

13. The complex lighting for a vehicle of claim 1, wherein the second lighting unit comprises a third reflection module having a second space where light transfers to from the outlet portion of the first lighting unit.

14. The complex lighting for a vehicle of claim 13, wherein the second lighting unit comprises a second light source module that irradiates light in the second space.

15. The complex lighting for a vehicle of claim 14, wherein the light emission surface facing the bottom of the first reflection module is bent.

16. The complex lighting for a vehicle of claim 13, wherein the first reflection module includes at least one bent portion where a side portion is bent based on an irradiation direction of the first light source module.

17. The complex lighting for a vehicle of claim 13, wherein the first lighting unit introducing the light of the second lighting unit is configured as a pair of first lighting units.

18. The complex lighting for a vehicle of claim 17, wherein each outlet portion of each of the pair of the first lighting unit is coupled to a respective end of the second lighting unit such that the second lightning unit is between each of the first lighting units.

* * * * *